(12) United States Patent
Sczomak et al.

(10) Patent No.: US 9,957,911 B2
(45) Date of Patent: May 1, 2018

(54) DEDICATED EXHAUST GAS RECIRCULATION CONTROL SYSTEMS AND METHODS

(71) Applicant: GM Global Technology Operations LLC, Detroit, MI (US)

(72) Inventors: David P. Sczomak, Troy, MI (US); Kushal Narayanaswamy, Troy, MI (US); Edward J. Keating, Ortonville, MI (US)

(73) Assignees: GM GLOBAL TECHNOLOGY OPERATIONS LLC, Detroit, MI (US); U.S. Department of Energy, Washington, DC (US)

( * ) Notice: Subject to any disclaimer, the term of this patent is extended or adjusted under 35 U.S.C. 154(b) by 95 days.

(21) Appl. No.: 15/046,580

(22) Filed: Feb. 18, 2016

(65) Prior Publication Data

US 2017/0241364 A1    Aug. 24, 2017

(51) Int. Cl.
*F02D 41/30* (2006.01)
*F02M 26/15* (2016.01)
(Continued)

(52) U.S. Cl.
CPC ........ *F02D 41/3011* (2013.01); *F01N 3/2066* (2013.01); *F01N 3/2073* (2013.01);
(Continued)

(58) Field of Classification Search
CPC ............. F02D 41/3011; F02D 41/0065; F02D 41/0052; F02D 35/0015; F02M 26/35; F02M 26/15; F02M 26/38
(Continued)

(56) References Cited

U.S. PATENT DOCUMENTS

| 4,305,351 A | 12/1981 | Staerzl |
| 5,021,227 A | 6/1991 | Kobayashi et al. |

(Continued)

FOREIGN PATENT DOCUMENTS

| DE | 10155404 A1 | 5/2003 |
| DE | 69922366 T2 | 12/2005 |

(Continued)

OTHER PUBLICATIONS

U.S. Appl. No. 14/994,531, filed Feb. 13, 2016, Sczomak et al.

(Continued)

*Primary Examiner* — Joseph Dallo
*Assistant Examiner* — Yi-Kai Wang (57) ABSTRACT

An engine control system of a vehicle includes a fuel control module that controls fuel injection of a first cylinder of an engine based on a first target air/fuel ratio that is fuel lean relative to a stoichiometric air/fuel ratio and that controls fuel injection of a second cylinder of the engine based on a second target air/fuel ratio that is fuel rich relative to stoichiometry. The first cylinder outputs exhaust to a first three way catalyst (TWC), and the second cylinder outputs exhaust to an exhaust gas recirculation (EGR) valve. An EGR control module controls opening of the EGR valve to: (i) a second TWC that reacts with nitrogen oxides (NOx) in the exhaust and outputs ammonia to a selective catalytic reduction (SCR) catalyst; and (ii) a conduit that recirculates exhaust back to an intake system of the engine.

20 Claims, 4 Drawing Sheets

(51) Int. Cl.

| | | |
|---|---|---|
| F02M 26/35 | (2016.01) | |
| F02M 26/38 | (2016.01) | |
| F02D 35/00 | (2006.01) | |
| F02D 41/00 | (2006.01) | |
| F01N 3/20 | (2006.01) | |
| F02D 41/14 | (2006.01) | |
| F02M 26/05 | (2016.01) | |
| F02M 26/43 | (2016.01) | |
| F02M 26/71 | (2016.01) | |

(52) U.S. Cl.
CPC ....... *F02D 35/0015* (2013.01); *F02D 41/005* (2013.01); *F02D 41/008* (2013.01); *F02D 41/0052* (2013.01); *F02D 41/0065* (2013.01); *F02D 41/1463* (2013.01); *F02M 26/05* (2016.02); *F02M 26/15* (2016.02); *F02M 26/35* (2016.02); *F02M 26/38* (2016.02); *F02M 26/43* (2016.02); *F02M 26/71* (2016.02); *Y02T 10/22* (2013.01); *Y02T 10/47* (2013.01)

(58) Field of Classification Search
USPC .......................................................... 701/103
See application file for complete search history.

(56) References Cited

U.S. PATENT DOCUMENTS

| | | |
|---|---|---|
| 5,575,259 A | 11/1996 | Fukui et al. |
| 5,778,667 A | 7/1998 | Kinugasa et al. |
| 5,782,087 A | 7/1998 | Kinugasa et al. |
| 6,047,542 A | 4/2000 | Kinugasa et al. |
| 6,089,077 A | 7/2000 | Daniels |
| 6,109,024 A | 8/2000 | Kinugasa et al. |
| 6,170,458 B1 | 1/2001 | Miller |
| 6,227,164 B1 | 5/2001 | Miller |
| 6,345,496 B1 | 2/2002 | Fuwa et al. |
| 6,357,408 B1 | 3/2002 | Bridge et al. |
| 6,361,754 B1 | 3/2002 | Peter-Hoblyn et al. |
| 6,401,703 B1 | 6/2002 | Mamiya et al. |
| 6,520,142 B2 | 2/2003 | Nogi et al. |
| 6,557,526 B1 | 5/2003 | Hoshino |
| 6,609,493 B2 | 8/2003 | Yamaguchi et al. |
| 6,659,074 B2 | 12/2003 | Lippert et al. |
| 6,662,552 B1 | 12/2003 | Gunther et al. |
| 6,775,623 B2 | 8/2004 | Ali et al. |
| 6,854,438 B2 | 2/2005 | Hilger et al. |
| 6,904,752 B2 | 6/2005 | Foster et al. |
| 7,063,642 B1 | 6/2006 | Hu et al. |
| 7,152,573 B2 | 12/2006 | Abet et al. |
| 7,204,081 B2 | 4/2007 | Yasui et al. |
| 7,377,273 B2 * | 5/2008 | Miyashita ............. F01N 3/0814 123/672 |
| 7,472,545 B2 | 1/2009 | Hemingway et al. |
| 7,610,900 B2 | 11/2009 | Lippert et al. |
| 7,673,444 B2 | 3/2010 | Yano et al. |
| 7,731,925 B2 | 6/2010 | Gloeckle |
| 7,814,747 B2 | 10/2010 | Bandl-Konrad et al. |
| 8,041,498 B2 | 10/2011 | Brown et al. |
| 8,091,342 B2 | 1/2012 | Perry et al. |
| 8,146,555 B2 | 4/2012 | Solomon et al. |
| 8,291,695 B2 | 10/2012 | Perry et al. |
| 8,381,512 B2 | 2/2013 | Brinkman et al. |
| 8,393,140 B2 | 3/2013 | Perry et al. |
| 8,424,289 B2 | 4/2013 | Narayanaswamy et al. |
| 8,448,423 B2 | 5/2013 | Najt et al. |
| 2002/0069640 A1 | 6/2002 | Irisawa et al. |
| 2002/0129600 A1 | 9/2002 | Yamamoto et al. |
| 2003/0085643 A1 | 5/2003 | Matsubara |
| 2003/0089331 A1 | 5/2003 | Ueda et al. |
| 2003/0168038 A1 | 9/2003 | McKay |
| 2004/0011326 A1 | 1/2004 | Yamashita et al. |
| 2004/0012318 A1 | 1/2004 | Ishikawa |
| 2005/0129601 A1 | 6/2005 | Li et al. |
| 2007/0051333 A1 | 3/2007 | Ashizawa |
| 2007/0092426 A1 | 4/2007 | Driscoll et al. |
| 2007/0137182 A1 | 6/2007 | Driscoll |
| 2007/0157608 A1 | 7/2007 | Gandhi et al. |
| 2008/0026932 A1 | 1/2008 | Satoh et al. |
| 2008/0041040 A1 | 2/2008 | During |
| 2008/0053071 A1 | 3/2008 | Adams et al. |
| 2008/0089820 A1 | 4/2008 | Jacob |
| 2008/0102010 A1 | 5/2008 | Bruck et al. |
| 2010/0186391 A1 | 7/2010 | Najt et al. |
| 2010/0212295 A1 | 8/2010 | Narayanaswamy et al. |
| 2011/0083639 A1 | 4/2011 | Gallon et al. |
| 2012/0166070 A1* | 6/2012 | Katou ................. F02D 41/0065 701/108 |
| 2012/0204845 A1* | 8/2012 | Gingrich ................ F02M 26/43 123/568.17 |
| 2012/0316754 A1 | 12/2012 | Narayanaswamy et al. |
| 2013/0074817 A1* | 3/2013 | Fisher ................ F02M 21/0215 123/674 |
| 2015/0354424 A1* | 12/2015 | Kumar .................. F01N 3/2066 60/605.1 |
| 2015/0354484 A1 | 12/2015 | Zur Loye et al. |
| 2016/0025021 A1* | 1/2016 | Hilditch ................ F02M 26/16 60/274 |
| 2017/0037757 A1* | 2/2017 | Tanaka ..................... F01N 3/101 |
| 2017/0159525 A1* | 6/2017 | Backhaus ............. F01N 3/2053 |

FOREIGN PATENT DOCUMENTS

| | | |
|---|---|---|
| DE | 102005022420 A1 | 6/2006 |
| JP | 2000277234 A | 10/2000 |
| JP | 2003257585 A | 9/2003 |
| JP | 2006318664 A | 11/2006 |

OTHER PUBLICATIONS

About.com, "Port Fuel Injection", archived Sep. 17, 2005.
Hybrid Spark Plug OE Success for NGK with New Audi R8, NGK Press Release, Apr. 24, 2007, p. 1-2, NGK Spark Plugs (UK) Limited, Hemel Hempstead, UnitedKingdom.
Hybrid Spark Plug OE Success for NGK with New Audi R8, NGK Press Release, 2006, p. 1, NGK Spark Plug Europe GmbH, Ratingen, Germany.
Joseph R. Theis "Selective Catalytic Reduction for Treating the NOx Emissions from Lean-Burn Gasoline Engines: Performance Assessment" SAE Technical Paper Series, Detroit, MI, USA.
Joseph R. Theis "Selective Catalytic Reduction for Treating the NOx Emissions from Lean-Burn Gasoline Engines: Durability Assessment" SAE Technical Paper Series, Detroit, MI, USA.
Kim, C., Perry, K., Viola, M., Li, W. et al., "Three-Way Catalyst Design for Urealess Passive Ammonia SCR: Lean-Burn SIDI Aftertreatment System," SAE Technical Paper 2011-01-0306, 2011, doi:10.4271/2011-01-0306.
Nakahira, T., "Catalytic Engine" NOx Reduction of Diesel Engine with New Concept Onboard Ammonia Synthesis System, SAE 920469, 1992, SAE International, Detroit, MI.
Ogunwumi, S., In-Situ NH3 Generation for SCR NOx Applications, SAE 2002-01-2872, 2002, SAE International, San Diego, CA.
Szekely, G, Combustion Characteristics of a Spray-Guided DI Stratified Charge Engine with a High Squish Piston, SAE Tech Paper, 2005-01-1937, SAEWarrendale PA USA.
Tadao Nakatsuji "A NOx Reduction system using ammonia-storage selective catalytic reduction in rich/lean excursions" Science Direct, Jul. 27, 2007.

* cited by examiner

DEDICATED EXHAUST GAS RECIRCULATION CONTROL SYSTEMS AND METHODS

STATEMENT OF GOVERNMENT RIGHTS

This invention was produced pursuant to United States Government Program No. DE-EE00006853 with the U.S. Department of Energy (DoE). The U.S. Government has certain rights in this invention.

FIELD

The present disclosure relates to internal combustion engines and more particularly to engine control systems and methods for reducing nitrogen oxide (NOx) in exhaust.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Air is drawn into an engine through an intake manifold. A throttle valve controls airflow into the engine. The air mixes with fuel from one or more fuel injectors to form an air/fuel mixture. The air/fuel mixture is combusted within one or more cylinders of the engine. Combustion of the air/fuel mixture generates torque.

Exhaust resulting from the combustion of the air/fuel mixture is expelled from the cylinders to an exhaust system. The exhaust includes nitrogen oxides (NOx), such as nitrogen oxide (NO) and nitrogen dioxide ($NO_2$), and other exhaust constituents. The exhaust system includes one or more components, such as a selective catalytic reduction (SCR) catalyst and/or a lean NOx trap, that reduce NOx in the exhaust before the exhaust is expelled to atmosphere.

SUMMARY

In a feature, an engine control system of a vehicle is described. A fuel control module controls fuel injection of a first cylinder of an engine based on a first target air/fuel ratio that is fuel lean relative to a stoichiometric air/fuel ratio and controls fuel injection of a second cylinder of the engine based on a second target air/fuel ratio that is fuel rich relative to stoichiometry. The first cylinder outputs exhaust to a first three way catalyst (TWC), and the second cylinder outputs exhaust to an exhaust gas recirculation (EGR) valve. An EGR control module controls opening of the EGR valve to: (i) a second TWC that reacts with nitrogen oxides (NOx) in the exhaust and outputs ammonia to a selective catalytic reduction (SCR) catalyst; and (ii) a conduit that recirculates exhaust back to an intake system of the engine.

In further features, the fuel control module decreases the second target air/fuel ratio to richen fueling of the second cylinder when NOx measured using a NOx sensor downstream of the SCR catalyst is greater than a target NOx at the NOx sensor.

In further features, the fuel control module increases the second target air/fuel ratio to lean fueling of the second cylinder when NOx measured using a NOx sensor downstream of the SCR catalyst is less than a target NOx at the NOx sensor.

In further features, when NOx measured using a NOx sensor downstream of the SCR catalyst is greater than a target NOx at the NOx sensor, the EGR control module: increases the opening of the EGR valve to the second TWC to increase exhaust flow to the second TWC; and decreases the opening of the EGR valve to the conduit that directs exhaust back to the intake system to decrease exhaust recirculation back to the intake system.

In further features, when NOx measured using a NOx sensor downstream of the SCR catalyst is less than a target NOx at the NOx sensor, the EGR control module: decreases the opening of the EGR valve to the second TWC to decrease exhaust flow to the second TWC; and increases the opening of the EGR valve to the conduit that directs exhaust back to the intake system to increase exhaust recirculation back to the intake system.

In further features, the fuel control module decreases the second target air/fuel ratio to richen fueling of the second cylinder when an air/fuel ratio measured using a sensor in the conduit is greater than a target air/fuel ratio at the sensor.

In further features, the fuel control module increases the second target air/fuel ratio to lean fueling of the second cylinder when an air/fuel ratio measured using a sensor in the conduit is less than a target air/fuel ratio at the sensor.

In further features, a throttle control module, when an air/fuel ratio measured using a sensor in the conduit is greater than a target air/fuel ratio at the sensor, decreases an opening of a throttle valve that regulates flow from an intake manifold into the second cylinder. The throttle valve does not regulate flow from the intake manifold into the first cylinder.

In further features, a throttle control module, when an air/fuel ratio measured using a sensor in the conduit is less than a target air/fuel ratio at the sensor, increases an opening of a throttle valve that regulates flow from an intake manifold into the second cylinder. The throttle valve does not regulate flow from the intake manifold into the first cylinder.

In further features: the first TWC includes one or more materials that provide an oxygen storage capacity of at least a predetermined capacity that is greater than zero; and the second TWC has an oxygen storage capacity of approximately zero.

In a feature, an engine control method for a vehicle is described. The engine control method includes: controlling fuel injection of a first cylinder of an engine based on a first target air/fuel ratio that is fuel lean relative to a stoichiometric air/fuel ratio, wherein the first cylinder outputs exhaust to a first three way catalyst (TWC); controlling fuel injection of a second cylinder of the engine based on a second target air/fuel ratio that is fuel rich relative to stoichiometry, wherein the second cylinder outputs exhaust to an exhaust gas recirculation (EGR) valve; and controlling opening of the EGR valve to: (i) a second TWC that reacts with nitrogen oxides (NOx) in the exhaust and outputs ammonia to a selective catalytic reduction (SCR) catalyst; and (ii) a conduit that recirculates exhaust back to an intake system of the engine.

In further features, the engine control method includes decreasing the second target air/fuel ratio to richen fueling of the second cylinder when NOx measured using a NOx sensor downstream of the SCR catalyst is greater than a target NOx at the NOx sensor.

In further features, the engine control method includes increasing the second target air/fuel ratio to lean fueling of the second cylinder when NOx measured using a NOx sensor downstream of the SCR catalyst is less than a target NOx at the NOx sensor.

In further features, the engine control method includes, when NOx measured using a NOx sensor downstream of the SCR catalyst is greater than a target NOx at the NOx sensor: increasing the opening of the EGR valve to the second TWC to increase exhaust flow to the second TWC; and decreasing the opening of the EGR valve to the conduit that directs exhaust back to the intake system to decrease exhaust recirculation back to the intake system.

In further features, the engine control method includes, when NOx measured using a NOx sensor downstream of the SCR catalyst is less than a target NOx at the NOx sensor: decreasing the opening of the EGR valve to the second TWC to decrease exhaust flow to the second TWC; and increasing the opening of the EGR valve to the conduit that directs exhaust back to the intake system to increase exhaust recirculation back to the intake system.

In further features, the engine control method includes decreasing the second target air/fuel ratio to richen fueling of the second cylinder when an air/fuel ratio measured using a sensor in the conduit is greater than a target air/fuel ratio at the sensor.

In further features, the engine control method includes increasing the second target air/fuel ratio to lean fueling of the second cylinder when an air/fuel ratio measured using a sensor in the conduit is less than a target air/fuel ratio at the sensor.

In further features, the engine control method includes, when an air/fuel ratio measured using a sensor in the conduit is greater than a target air/fuel ratio at the sensor, decreasing an opening of a throttle valve that regulates flow from an intake manifold into the second cylinder, wherein the throttle valve does not regulate flow from the intake manifold into the first cylinder.

In further features, the engine control method includes, when an air/fuel ratio measured using a sensor in the conduit is less than a target air/fuel ratio at the sensor, increasing an opening of a throttle valve that regulates flow from an intake manifold into the second cylinder. The throttle valve does not regulate flow from the intake manifold into the first cylinder.

In further features: the first TWC includes one or more materials that provide an oxygen storage capacity of at least a predetermined capacity that is greater than zero; and the second TWC has an oxygen storage capacity of approximately zero.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An engine combusts air and fuel within cylinders to generate torque. An engine control module (ECM) controls air and fuel to the engine based on a target air/fuel ratio. For lean burn engines, the target air/fuel ratio is fuel lean relative to a stoichiometric air/fuel ratio during normal engine operation. As an example, stoichiometry for air and gasoline and air is approximately 14.7:1, while a lean burn gasoline engine may have a target air/fuel ratio of 16:1 air to gasoline across all of the cylinders or a greater amount of air, such as 20:1, 24:1, 28:1, etc. Different types of fuel have different stoichiometric air/fuel ratios.

The engine outputs exhaust resulting from combustion of air and fuel to an exhaust system. Among other things, the exhaust includes nitrogen oxides (NOx), such as nitrogen oxide (NO) and nitrogen dioxide ($NO_2$). The exhaust system includes one or more components that reduce NOx in the exhaust before the exhaust is expelled to atmosphere.

For example, the exhaust system may include a selective catalytic reduction (SCR) catalyst that stores ammonia ($NH_3$). Ammonia stored by the SCR catalyst reacts with NOx in the exhaust. A three way catalyst (TWC) generates and supplies ammonia to the SCR catalyst when fueling of the engine is fuel rich relative to stoichiometry.

According to the present application, a first set of one or more cylinders outputs exhaust to a first portion of the exhaust system. The ECM controls fueling of the first set of cylinders using fuel lean fueling relative to stoichiometry.

A second cylinder outputs exhaust to a second portion of the exhaust system. One or more other cylinders may also output exhaust to the second portion of the exhaust system. The ECM controls fueling of the second cylinder (and the one or more other cylinders) using fuel rich fueling relative to stoichiometry.

An exhaust gas recirculation system recirculates exhaust from the second portion of the exhaust system back to an intake system of the engine. The second portion of the exhaust system includes a three way catalyst that, based on the fuel rich operation of the second cylinder (and the one or more other cylinders) generates and supplies ammonia for an SCR catalyst implemented downstream of the three way catalyst. The fuel rich operation also provides Hydrogen ($H_2$) rich exhaust for recirculation back to the intake system. The Hydrogen rich exhaust may improve one or more operating characteristics of the first set of cylinders.

Figure 1:
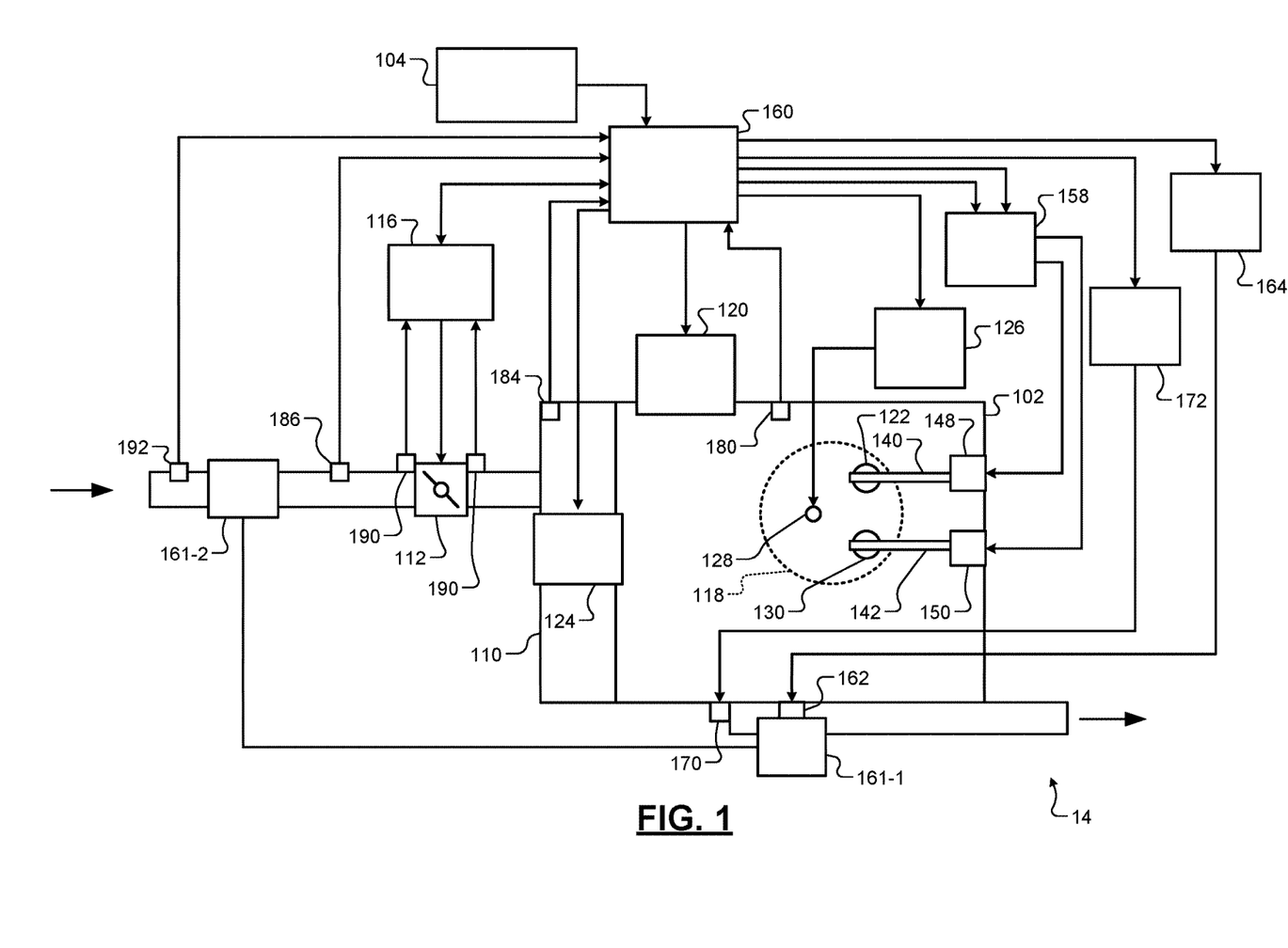
FIG. 1 is a functional block diagram of an example engine system.

Referring now to FIG. 1, a functional block diagram of an example engine and exhaust system is presented. An engine 102 combusts an air/fuel mixture to produce drive torque for a vehicle based on driver input from a driver input module 104, such as accelerator pedal position and/or brake pedal position. While the engine 102 is shown and will be discussed as a gasoline type lean burn engine, the engine 102 may be another type of lean burn engine. One or more electric motors (or motor-generators) may additionally or alternatively generate drive torque for the vehicle.

Air is drawn into the engine 102 through an intake system. For example only, the intake system may include an intake manifold 110 and a throttle valve 112. The throttle valve 112 may include a butterfly valve having a rotatable blade or another suitable type of throttle valve. An engine control module (ECM) 160 controls a throttle actuator module 116, and the throttle actuator module 116 regulates opening of the throttle valve 112 to control the amount of air drawn into the intake manifold 110.

Air from the intake manifold 110 is drawn into cylinders of the engine 102. While the engine 102 includes multiple cylinders, for illustration purposes a single representative cylinder 118 is shown. The engine 102 is shown including 4 cylinders in FIG. 2, although the engine 102 may include 2, 3, 4, 5, 6, 8, 10, and/or 12 cylinders. Under some circumstances, the ECM 160 may instruct a cylinder actuator module 120 to selectively deactivate opening of intake and exhaust valves of one or more of the cylinders.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 160 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. A spark actuator module 126 energizes a spark plug 128 in the cylinder 118 based on a signal from the ECM 160, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

During the combustion stroke, the combustion of the air/fuel mixture drives the piston down, thereby driving the crankshaft. The combustion stroke may be defined as the time between the piston reaching TDC and the time at which the piston returns to bottom dead center (BDC). During the exhaust stroke, the piston begins moving up from BDC and expels the byproducts of combustion through an exhaust valve 130. The byproducts of combustion are exhausted from the vehicle via an exhaust system 14.

The intake valve 122 may be controlled by an intake camshaft 140, while the exhaust valve 130 may be controlled by an exhaust camshaft 142. The cylinder actuator module 120 may deactivate the cylinder 118 by disabling opening of the intake valve 122 and/or the exhaust valve 130.

An intake cam phaser 148 selectively adjusts rotation of the intake camshaft 140 relative to rotation of the crankshaft. Adjusting the rotation of the intake camshaft 140 adjusts opening and closing timing of the intake valve 122. An exhaust cam phaser 150 selectively adjusts rotation of the exhaust camshaft 142 relative to rotation of the crankshaft. Adjusting the rotation of the exhaust camshaft 142 adjusts opening and closing timing of the exhaust valve 130.

A phaser actuator module 158 controls the intake cam phaser 148 and the exhaust cam phaser 150 based on signals from the ECM 160. When implemented, variable valve lift (not shown) may also be controlled by the phaser actuator module 158. The phaser actuator module 158 may also control the second intake and exhaust cam phasers based on signals from the ECM 160. While camshaft-based valve actuation is shown and discussed, camless valve actuation may be implemented.

Figure 2:
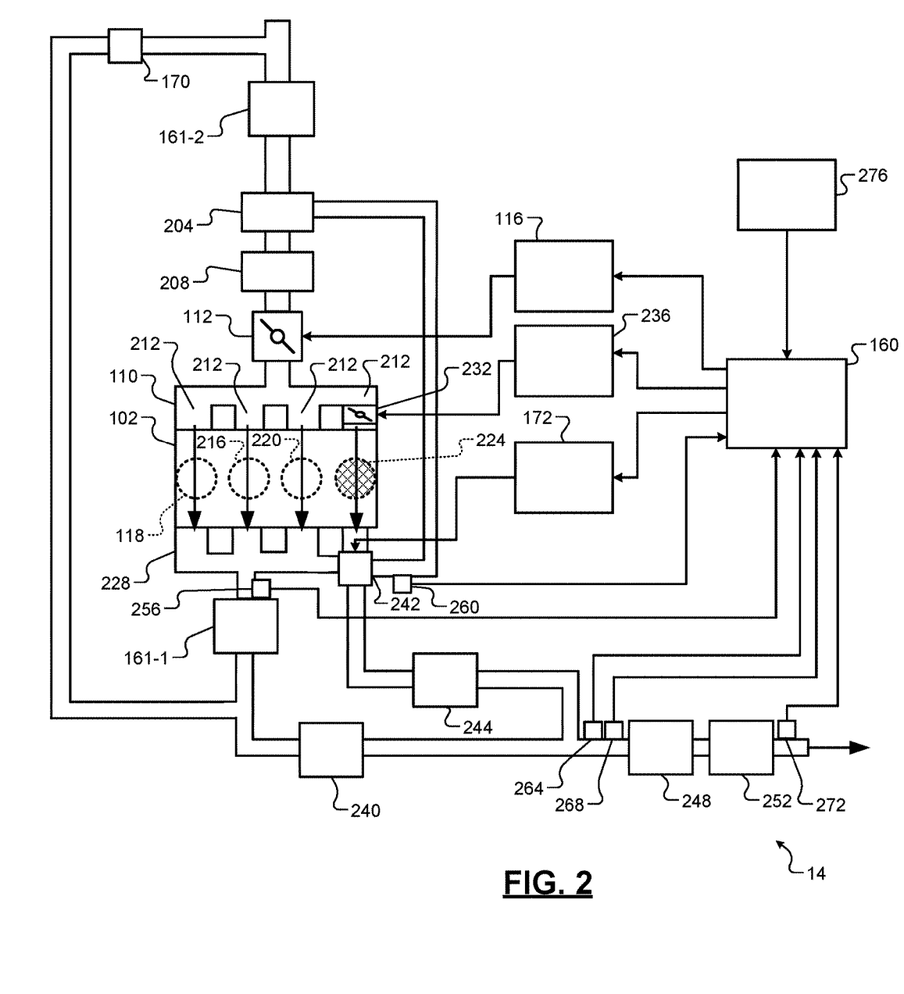
FIG. 2 is a functional block diagram of an engine and exhaust control system.

The engine system may include a boost device that provides pressurized air to the intake manifold 110. For example, FIGS. 1 and 2 show a turbocharger including a turbine 161-1 that is powered by exhaust gases flowing through the exhaust system 14. The turbocharger also includes a compressor 161-2, driven by the turbine 161-1, that compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 161-1, thereby reducing the boost (the amount of intake air compression) of the turbocharger. The ECM 160 may control the turbocharger via a boost actuator module 164. The boost actuator module 164 may modulate the boost of the turbocharger by controlling the position of the wastegate 162. In various implementations, multiple turbochargers may be controlled by the boost actuator module 164. The turbocharger may have variable geometry, which may be controlled by the boost actuator module 164.

The engine system includes an exhaust gas recirculation (EGR) valve 170, which selectively redirects exhaust gas back to the intake system. Further illustration and explanation of the EGR system is provided below with respect to FIG. 2. The EGR valve 170 may be controlled by an EGR actuator module 172 based on signals from the ECM 160.

A position of the crankshaft may be measured using a crankshaft position sensor 180. An engine speed, for example in revolutions per minute (RPM), may be generated based on the position of the crankshaft. A pressure within the intake manifold 110 may be measured using a manifold absolute pressure (MAP) sensor 184. In various implementations, engine vacuum, which may refer to a difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. An ambient temperature of air being drawn into the engine 102 may be measured using an intake air temperature (IAT) sensor 192. One or more other sensors may also be implemented. For example, the engine system may include an engine coolant temperature sensor, an oil temperature sensor, an engine (e.g., block) temperature sensor, and/or one or more other suitable vehicle sensors. The ECM 160 may use signals from the sensors to make control decisions for the engine system.

FIG. 2 includes a functional block diagram of an example system including the engine 102 and the exhaust system 14. A mixer 204 may be implemented to mix air flowing into the engine 102 with recirculated exhaust gas from an EGR valve 242. An intercooler (or a charge air cooler) 208 may cool some of the (possibly heated) gas flowing into the engine 102. Heat may be attributable to, for example, compression of the air by the compressor 161-2, recirculated exhaust gas, and/or proximity of the intake system to components of the exhaust system 14.

The throttle valve 112 regulates flow into the intake manifold 110. The intake manifold 110 includes intake runners 212 for the cylinders, respectively. In the example of FIG. 2, the engine 102 is shown as including four cylinders, cylinder 118, cylinder 216, cylinder 220, and cylinder 224, although the engine 102 may include a greater or lesser number of cylinders.

A second throttle valve 232 regulates airflow from the intake manifold 110 into the cylinder 224. While the present application will be discussed with respect to the example of the second throttle valve 232 regulating airflow into only the cylinder 224, the second throttle valve 232 or another throttle valve may be implemented to regulate airflow from the intake manifold 110 into one or more other cylinders.

A second throttle actuator module 236 controls opening of the second throttle valve 232 based on signals from the ECM 160. When the second throttle valve 232 is fully open, airflow into the cylinder 224 may be approximately equal to airflow into the cylinders 118, 216, and 220. The second throttle valve 232 may be closed, for example, to decrease airflow into the cylinder 224 relative to airflow into the cylinders 118, 216, and 220.

The cylinders 118, 216, and 220 output exhaust to an exhaust manifold 228. While the example of the three cylinders 118, 216, and 220 is provided, one or more other cylinders may be fueled similarly to the cylinders 118, 216, and 220 and output exhaust to the exhaust manifold 228. The cylinder 224 outputs exhaust to the EGR valve 242. While the example of only the cylinder 224 outputting exhaust to the EGR valve 242 is provided, one or more other cylinders may be fueled similarly to the cylinder 224 and output exhaust to the EGR valve 242. The exhaust may include particulate matter (PM), nitrogen oxides (NOx), such as nitrogen oxide (NO) and nitrogen dioxide ($NO_2$), and other components.

Exhaust flows from the exhaust manifold 228 to the turbocharger turbine 161-1 and the wastegate 162. The wastegate 162 is not shown in FIG. 2 for ease of illustration. Exhaust flows from the turbine 161-1 to a first three way catalyst (TWC) 240. The first TWC 240 may include one or more platinum group metals, such as Platinum, Palladium, and/or Rhodium, and may include one or more materials that can store oxygen (i.e., have oxygen storage capacity), such as Cerium and/or Zirconium Oxide. The first TWC 240 may also include at least a predetermined amount of one or more materials that can store NOx (i.e., have NOx storage capacity), such as one or more oxides of Barium and/or Potassium. Accordingly, the first TWC 240 may have at a NOx storage capacity that is greater than a predetermined capacity (greater than zero). In various implementations, a lean NOx trap may be implemented in place of the first TWC 240.

The EGR valve 242 includes a three-way valve such that the EGR valve 242 can direct exhaust gas to the exhaust manifold 228 (a first output path), to a second TWC 244 (a second output path), and/or back to the intake system (a third output path). The EGR valve 242 can be actuated to direct exhaust to one, two, or all three of the output paths at a given time.

The second TWC 244 does not include, or includes less than a predetermined minimum amount, of all materials that can store NOx (i.e., have NOx storage capacity). The second TWC 244 may include one or more platinum group metals, such as Platinum, Palladium, and/or Rhodium, and may include one or more materials that can store oxygen (i.e., have oxygen storage capacity), such as Cerium and/or Zirconium Oxide. The second TWC 244, however, may not include any materials that can store NOx (i.e., have NOx storage capacity), such as one or more oxides of Barium and/or Potassium. Accordingly, the second TWC 244 may have at a NOx storage capacity that is less than the predetermined capacity (which is greater than zero), such as approximately zero. When fueling of the cylinder 224 is fuel rich, the second TWC 244 reacts with the exhaust (e.g., NOx) and produces ammonia ($NH_3$) as a result of the reaction. Approximately zero in this case may mean zero or sufficiently small such that any oxygen storage capacity of the second TWC is negligible.

In various implementations, an air pump may be implemented to pump ambient air into the exhaust system between the EGR valve 242 and the second TWC 244. In such implementations, the second TWC 244 may be implemented on a particulate filter. For example, the second TWC 244 may be coated onto a particulate filter, such as a gasoline particulate filter (GPF). Injection of ambient air may facilitate regeneration of a particulate filter. Regeneration of a particulate filter includes oxidation (burning) of particulate matter trapped by the filter. In various implementations, the air pump may be implemented to pump ambient air into the exhaust system between the first TWC 240 and a selective catalytic reduction (SCR) catalyst 248.

Exhaust output by the first and second TWCs 240 and 244 flows to the SCR catalyst 248. In this manner, ammonia produced by the second TWC 244 is input to the SCR catalyst 248. The SCR catalyst 248 stores (e.g., adsorbs) ammonia input to the SCR catalyst 248. For example only, the SCR catalyst 248 may include a vanadium catalyst, a zeolite catalyst, and/or another suitable type of SCR catalyst. In various implementations, the SCR catalyst 248 may be implemented on a particulate filter. For example, the SCR catalyst 248 may be coated onto a particulate filter, such as a gasoline particulate filter (GPF).

The SCR catalyst 248 catalyzes a reaction between (stored by the SCR catalyst 248) and NOx passing through the SCR catalyst 248. An example chemical equation that is illustrative of ammonia adsorption is provided below.

$$NH_3+S \rightarrow NH_3(S)$$

The amount of ammonia stored by the SCR catalyst 248 is referred to as a current storage of the SCR catalyst 248. The current storage may be expressed, for example, as a mass of ammonia (e.g., grams), a number of moles of ammonia, or another suitable measure of an amount of ammonia stored by the SCR catalyst 248.

NOx and ammonia react at a known rate, which may be referred to as a reaction rate. The reaction rate may be described by the equation:

$$RR = \frac{X \text{ Moles } NH_3}{1 \text{ Mole } NOx},$$

where RR is the reaction rate and X varies depending on the amount of nitrogen dioxide ($NO_2$) in the exhaust. For example only, X may vary between from 1.0 and 2.0.

A percentage of NOx input to the SCR catalyst 248 that is removed from the exhaust via reaction with ammonia stored by the SCR catalyst 248 may be referred to as NOx conversion efficiency. The NOx conversion efficiency is directly related to the current storage of the SCR catalyst 248 and exhaust temperature. For example only, the NOx conversion efficiency increases as the current storage of the SCR catalyst 248 increases, and vice versa. The current storage of the SCR catalyst 248, however, is limited to a maximum amount of ammonia. This maximum amount of ammonia is referred to as the maximum storage capacity of the SCR catalyst 248. The maximum amount of ammonia that the SCR catalyst 248 can store may increase as temperature of the SCR catalyst 248 decreases and vice versa.

The reaction of ammonia with NOx produces nitrogen and water. Other components of the exhaust, such as oxygen ($O_2$), may also be involved in the ammonia and NOx reaction. The example chemical equations provided below are illustrative of the reaction of ammonia and NOx.

$$4NH_3 + 4NO + O_2 \rightarrow 4N_2 + 6H_2O$$

$$4NH_3 + 2NO + 2NO_2 \rightarrow N_2 + 6H_2O$$

$$8NH_3 + 6NO_2 \rightarrow N_2 + 12H_2O$$

Exhaust output from the SCR catalyst 248 flows to a third TWC 252. The third TWC 252 removes remaining HC and CO from the exhaust before the exhaust is expelled from the vehicle. The third TWC 252 may include one or more platinum group metals, such as Platinum, Palladium, and/or Rhodium, and may include one or more materials that can store oxygen (i.e., have oxygen storage capacity), such as Cerium and/or Zirconium Oxide. The third TWC 252, however, may not include any materials that can store NOx (i.e., have NOx storage capacity), such as one or more oxides of Barium and/or Potassium. Accordingly, the third TWC 252 may have at a NOx storage capacity that is less than the predetermined capacity (which is greater than zero), such as approximately zero.

A first air/fuel sensor 256, such as a wide range air fuel (WRAF) sensor, measures air/fuel ratio of the exhaust output from the exhaust manifold 228. A second air/fuel sensor 260, such as a WRAF sensor, measures air/fuel ratio of the exhaust being recirculated back to the intake system. A third air/fuel sensor 264, such as a WRAF sensor, measures air/fuel ratio of the exhaust flowing into the SCR catalyst 248. While the example of air/fuel sensors are provided, exhaust gas oxygen (EGO) sensors may be implemented in place of one or more of the first, second, and third air/fuel sensors 256, 260, 264.

A first NOx sensor 268 measures NOx (NOx IN) in the exhaust flowing into the SCR catalyst 248. A second NOx sensor 272 measures NOx (NOx OUT) in the exhaust flowing out of the third TWC 252. For example only, the first and second NOx sensors 268 and 272 may measure a mass flowrate of NOx (e.g., grams per second), a concentration of NOx (e.g., parts per million), or another suitable measure of the amount of NOx.

A user initiates vehicle startup and shutdown events via an ignition system 276. For example only, the ignition system 276 may include one or more buttons, switches, and/or other devices that a user may actuate to command that the vehicle be turned ON and OFF.

The ECM 160 controls the torque output of the engine 102, as discussed further below. The ECM 160 may also control the engine 102 based on signals from the ignition system 276. For example, the ECM 160 may initiate engine cranking to start the engine 102 when a vehicle ON signal is received. The ECM 160 may disable the engine 102 when a vehicle OFF signal is received.

Figure 3:
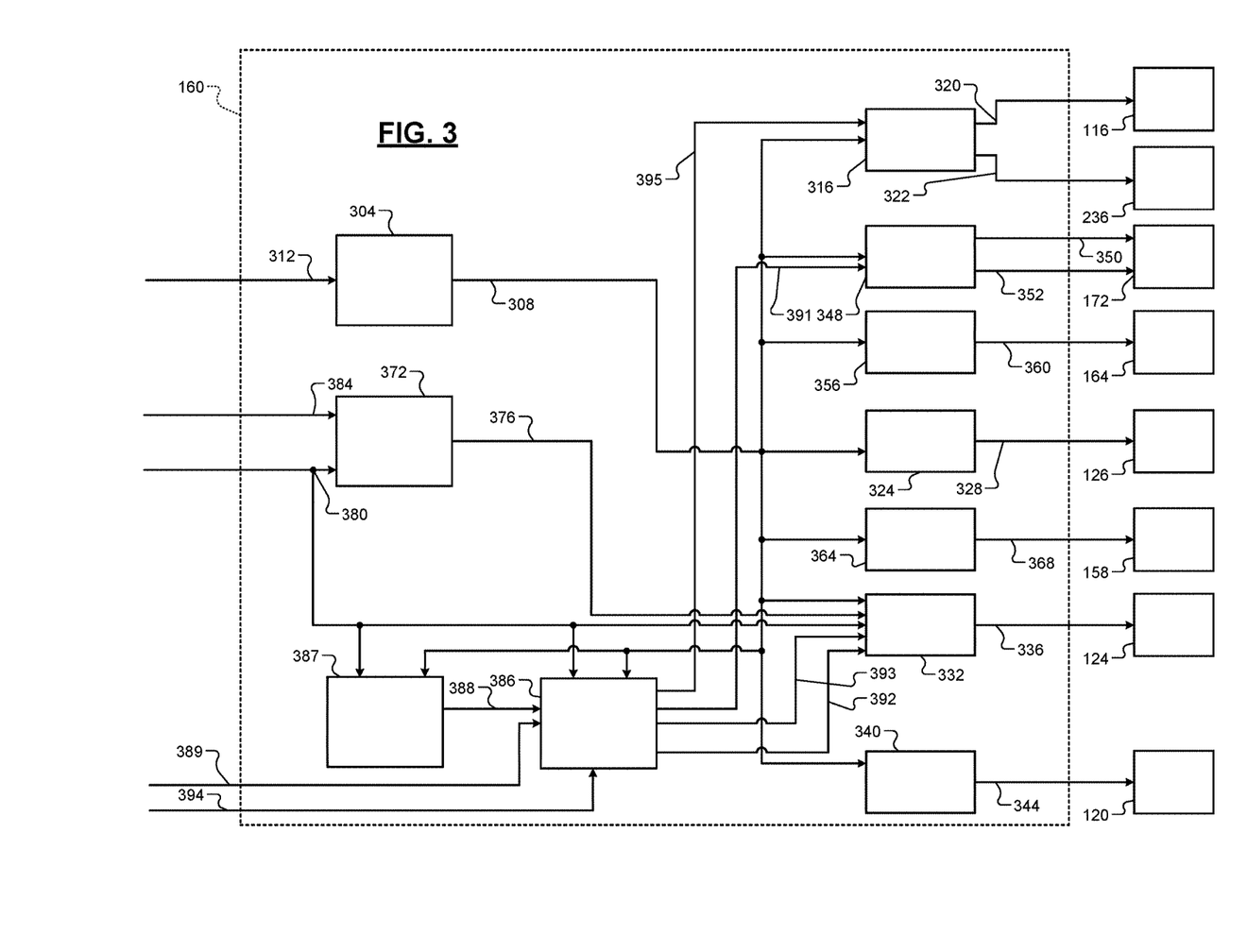
FIG. 3 is a functional block diagram of an example engine control module.

Referring now to FIG. 3, a functional block diagram of an example implementation of the ECM 160 is presented. A torque request module 304 may determine a torque request 308 based on one or more driver inputs 312, such as an accelerator pedal position, a brake pedal position, a cruise control input, and/or one or more other suitable driver inputs. The torque request module 304 may determine the torque request 308 additionally or alternatively based on one or more other torque requests, such as torque requests generated by the ECM 160 and/or torque requests received from other modules of the vehicle, such as a transmission control module, the hybrid control module, a chassis control module, etc. One or more engine actuators may be controlled based on the torque request 308 and/or one or more other vehicle operating parameters.

For example, a throttle control module 316 determines a first target throttle opening 320 and a second target throttle opening 322 based on the torque request 308. The throttle actuator module 116 controls opening of the throttle valve 112 based on the first target throttle opening 320. The second throttle actuator module 236 controls opening of the second throttle valve 232 based on the second target throttle opening 322.

A spark control module 324 may determine a target spark timing 328 based on the torque request 308. The spark actuator module 126 generates spark based on the target spark timing 328.

A fuel control module 332 determines a plurality of target fueling parameters 336. The target fueling parameters 336 include, for example, an amount of fuel injection for one of the cylinders 118, 216, and 220 and an amount of fuel injection for the cylinder 224. The target fueling parameters 336 may also include fuel injection timing. The fuel actuator module 124 controls fueling injection for the cylinders based on the respective target fueling parameters 336. Determination of the target fueling parameters is discussed further below.

A cylinder control module 340 may determine a target number of cylinders to activate and/or deactivate 344 based on the torque request 308. The cylinder actuator module 120 activates and deactivates opening of intake and exhaust valves of cylinders of the engine 102 based on the target number 344. The fuel control module 332 disables fueling of deactivated cylinders.

An EGR control module 348 determines a target position 350 for the EGR valve 170 based on the torque request 308. For example, the EGR control module 348 may determine the target position 350 using a function or mapping that relates torque requests to target positions of the EGR valve 170.

The EGR control module 348 also determines a target position 352 for the EGR valve 342, as discussed further below. The EGR actuator module 172 or another EGR actuator module controls the EGR valve 242 based on the target position 352.

A boost control module 356 may determine a target boost 360 based on the torque request 308. The boost actuator module 164 controls boost of the turbocharger based on the target boost 360. For example, the boost actuator module 164 may control opening of the wastegate 162 on the target boost 360. A phaser control module 364 may determine target intake and exhaust cam phaser angles 368 based on the torque request 308. The phaser actuator module 158 controls the intake and exhaust cam phasers 148 and 150 based on the target intake and exhaust cam phaser angles 368, respectively.

As stated above, the fuel control module 332 determines the target fueling parameters 336. More specifically, the fuel control module 332 determines a mass of fuel to inject for one of the cylinders 118, 216, and 220 to achieve a first target air/fuel ratio with a mass of air trapped within that cylinder. This mass of air trapped within a cylinder of one of the cylinders 118, 216, and 220 will be referred to as a lean cylinder air per cylinder (APC).

The fuel control module 332 also determines a mass of fuel to inject for the cylinder 224 to achieve a second target air/fuel ratio with a mass of air trapped within the cylinder 224. This mass of air trapped within the cylinder 224 will be referred to as a rich cylinder APC.

An APC module 372 determines the lean and rich cylinder APCs. The lean and rich cylinder APCs are collectively illustrated in FIG. 3 by APCs 376. The APC module 372 may determine the lean cylinder APC, for example, based on, for example, an engine speed 380 measured using the crankshaft position sensor 180, a MAF 384 measured using the MAF sensor 186, and/or a MAP measured using the MAP sensor 184. The APC module 372 may determine the lean cylinder APC, for example, using one or more functions and/or mappings that relate engine speeds, MAFs, and/or MAPs to lean cylinder APCs. The engine speed 380 may be determined, for example, by determining a change in crankshaft position measured using the crankshaft position sensor 180 over a predetermined period.

The APC module 372 may determine the rich cylinder APC, for example, based on, for example, based on the lean cylinder APC and an opening of the second throttle valve 232. The APC module 372 may determine the rich cylinder APC, for example, using one or more functions and/or mappings that relate lean cylinder APCs and openings of the second throttle valve 232 to rich cylinder APCs.

The fuel control module 332 determines the first target air/fuel ratio (for the cylinders 118, 216, and 220) and the second target air/fuel ratio (for the cylinder 224). The fuel control module 332 determines the first target air/fuel ratio for the cylinders 118, 216, and 220, for example, based on the engine speed 380 and the torque request 308. The fuel control module 332 may determine the first target air/fuel ratio, for example, using one or more functions and/or mappings that relate engine speeds and torque requests to first target air/fuel ratios. While the example of the torque request 308 is provided, another parameter that is indicative of an engine load or an Ammonia storage target of the SCR catalyst 248 may be used.

In various implementations, the APC module 372 may adjust the lean and/or rich cylinder APCs and/or the fuel control module 332 may adjust the first target air/fuel ratio and/or the second target air/fuel ratio to increase or decrease engine-out lean NOx to meet the Ammonia storage target of the SCR catalyst 248. For example, the APC module 372 may adjust the rich cylinder APC to generate more ammonia while adjusting the lean cylinder APC lean the air/fuel ratio of the lean cylinders. These adjustment(s) may be made, for example, when the engine load meets one or more predetermined engine load conditions such as within a predetermined engine load range, above a predetermined engine load, or below a predetermined engine load. This is discussed further below.

The fuel control module 332 sets the first target air/fuel ratio either to stoichiometric air/fuel ratio for the fuel used or to a lean air/fuel ratio. The lean air/fuel ratio is fuel lean relative to the stoichiometric air/fuel ratio. Different types of fuel have different stoichiometric ratios. An example lean air/fuel ratio for gasoline is approximately 28:1 were stoichiometry is approximately 14.7:1 air to gasoline. The fuel control module 332 may set the first target air/fuel ratio to a lean air/fuel ratio, for example, when the engine speed 380 and the torque request 308 are within predetermined ranges for lean fueling of the cylinders 118, 216, and 220.

The fuel control module 332 determines the second target air/fuel ratio for the cylinder 224, for example, based on the engine speed 380 and the torque request 308. The fuel control module 332 may determine the second target air/fuel ratio, for example, using one or more functions and/or mappings that relate engine speeds and torque requests to second target air/fuel ratios. While the example of the torque request 308 is provided, another parameter that is indicative of an engine load may be used.

The fuel control module 332 sets the second target air/fuel ratio either to the stoichiometric air/fuel ratio for the fuel used or to a rich air/fuel ratio. The rich air/fuel ratio is fuel rich relative to the stoichiometric air/fuel ratio. The fuel control module 332 may set the second target air/fuel ratio to a rich air/fuel ratio, for example, when the engine speed 380 and the torque request 308 are within predetermined ranges for lean fueling of the cylinders 118, 216, and 220. An example rich air/fuel ratio for gasoline is approximately 14:1 were stoichiometry is approximately 14.7:1 air to gasoline.

As discussed further below, the fuel control module 332 may adjust the first target air/fuel ratio and/or the second target air/fuel ratio under some circumstances. In addition to or as an alternative to adjusting the first target air/fuel ratio and/or adjusting the second target air/fuel ratio, the EGR control module 348 may adjust the target position 352 of the EGR valve 242 and/or the throttle control module 316 may adjust the second target throttle opening 322 of the second throttle valve 232 under some circumstances.

Figure 4:
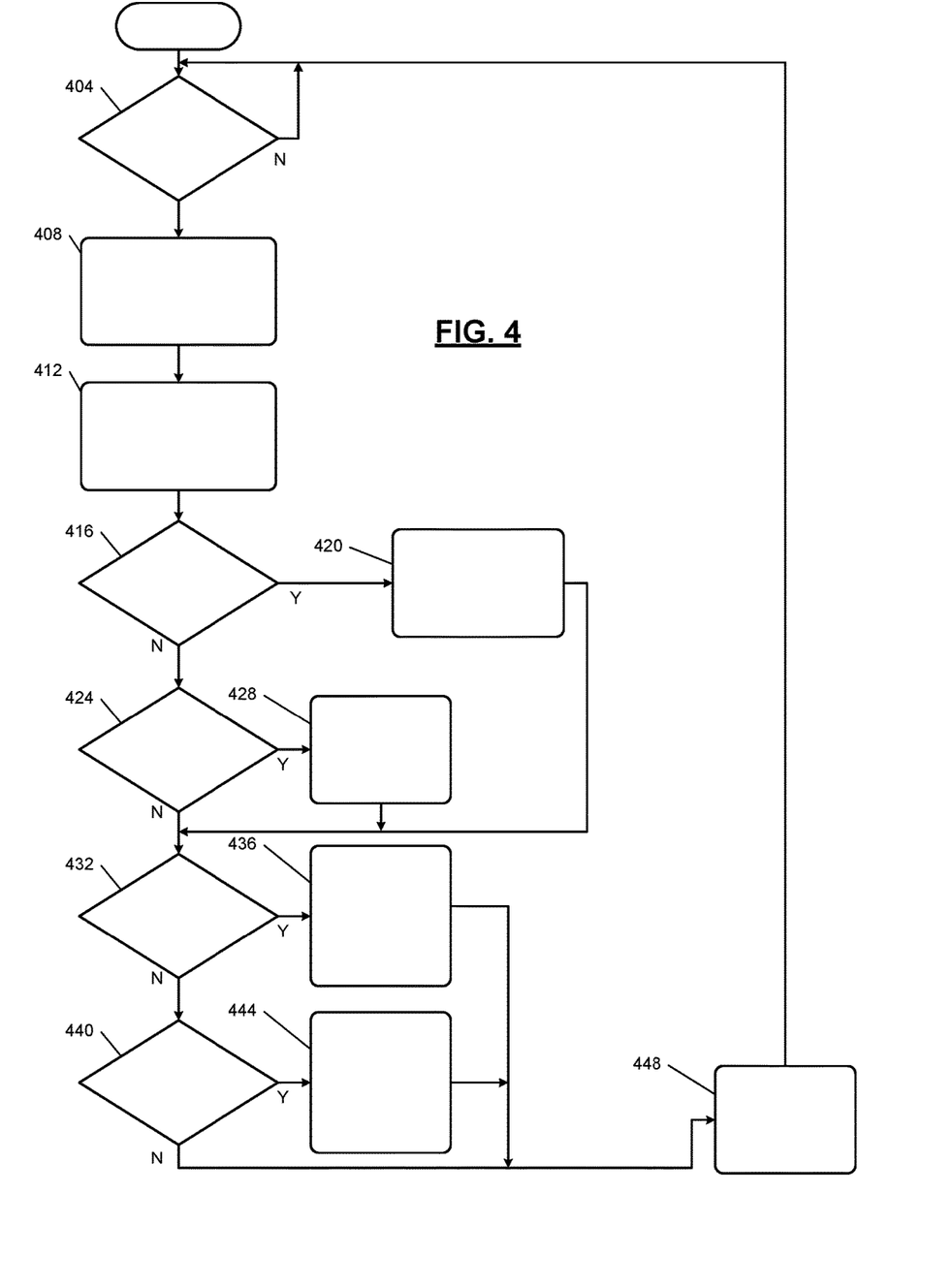
FIG. 4 is a flowchart depicting an example method of controlling fueling, throttling, and exhaust gas recirculation for NOx reduction and ammonia production.

FIG. 4 includes a flowchart depicting an example method of controlling fueling, throttling, and exhaust gas flow for NOx reduction and ammonia production. Referring now to FIGS. 3 and 4, control begins with 404 where an adjustment module 386 determines whether lean fueling of the engine 102 can be performed. For example, the fuel control module 332 may generate a fueling signal that indicates whether the first target air/fuel ratio for the cylinders 118, 216, and 220 is fuel lean relative to stoichiometry. Alternatively, the adjustment module 386 may determine whether the engine load (e.g., the torque request 308) and the engine speed 380 are within predetermined ranges for fueling using a lean air/fuel ratio at 404. If 404 is true, control continues with 408. If 404 is false, control may return to 404 for a next control loop.

At 408, the fuel control module 332 determines the first target air/fuel ratio for the cylinders 118, 216, and 220 and the second target air/fuel ratio for the cylinder 224. The fuel control module 332 determines the first target air/fuel ratio for the cylinders 118, 216, and 220 and the second target air/fuel ratio for the cylinder 224, for example, based on the engine speed 380 and the torque request 308. In this case (with 404 being true), the first target air/fuel ratio may be fuel lean relative to stoichiometry. The first target air/fuel ratio, however, may be set at stoichiometry. The second target air/fuel ratio is fuel rich relative to stoichiometry. The throttle control module 316 also determine the second target throttle opening 322 for the second throttle valve 232, and the EGR control module 348 determines the target position 352 of the EGR valve 242 at 408. Other target values for other engine actuators may also be determined at 408.

At 412, an exhaust target module 387 determines exhaust system targets 388. The exhaust system targets 388 include, for example, a target reductant (e.g., NOx) flowrate into the second TWC 244 to achieve a target ammonia production of the second TWC 244, a target NOx at the second NOx sensor 272, and a target air/fuel ratio in the recirculated exhaust gas at the second air/fuel sensor 260.

The exhaust target module 387 may determine the exhaust system targets 388, for example, based on the engine speed 380 and the engine load (e.g., the torque request 308). For example, the exhaust target module 387 may determine the target reductant flowrate into the second TWC 244 using one or more functions and/or mappings that relate engine speeds, engine loads, and current ammonia storage of the SCR catalyst 248 to target reductant flowrates. The ECM 160 may determine the current ammonia storage of the SCR catalyst 248, for example, based on a flowrate of NOx into the SCR catalyst 248, a flowrate of ammonia into the SCR catalyst 248, and the conversion efficiency of the SCR catalyst 248.

The exhaust target module 387 may determine the target NOx at the second NOx sensor 272 using one or more functions and/or mappings that relate engine speeds and engine loads to target NOx amounts. The exhaust target module 387 may determine the target air/fuel ratio at the second air/fuel sensor 260 using one or more functions and/or mappings that relate engine speeds and engine loads to target amounts of oxygen at the second air/fuel sensor 260.

At 416, the adjustment module 386 may determine whether a NOx output 389 measured using the second NOx sensor 272 is greater than the target NOx at the second NOx sensor 272 by at least a first predetermined amount. If 416 is true, the adjustment module 386 generates an EGR adjustment 391 at 420 to adjust the position of the EGR valve 242 to increase exhaust flow to the second TWC 244 and decrease EGR back to the intake system. The EGR control module 348 adjusts the target position 352 based on the EGR adjustment 391 to adjust the position of the EGR valve 242 to increase exhaust flow to the second TWC 244 relative to the (unadjusted) target position 352. When the EGR valve 242 is used to increase the exhaust flow to the second TWC 244 to increase Ammonia production, higher engine out lean NOx from the lean cylinders may result. In such circumstances, the EGR valve 170 may be adjusted to adjust (e.g., increase) EGR flow back to the engine.

Additionally or alternatively, the adjustment module 386 may generate a rich fueling adjustment 392 at 420 to richen fueling of the cylinder 224. The fuel control module 332 richens the second target air/fuel ratio for the cylinder 224 based on the rich fueling adjustment 392. Richening fueling of the cylinder 224 and/or increasing exhaust flow to the second TWC 244 increases reductant (e.g., HC, CO) flow to the second TWC 244. This increases ammonia production by the second TWC 244 and increases ammonia flow to the SCR catalyst 248 which should decrease NOx at the second NOx sensor 272. Control may then transfer to 432, which is discussed further below. If 416 is false, control continues with 424.

At 424, the adjustment module 386 may determine whether the NOx output 389 measured using the second NOx sensor 272 is less than the target NOx at the second NOx sensor 272 by at least a second predetermined amount. If 424 is true, the adjustment module 386 generates the EGR adjustment 391 at 428 to adjust the position of the EGR valve 242 to decrease exhaust flow to the second TWC 244 and to increase EGR back to the intake system. The EGR control module 348 adjusts the target position 352 based on the EGR adjustment 391 to adjust the position of the EGR valve 242 to decreases exhaust flow to the second TWC 244 relative to the (unadjusted) target position 352.

Additionally or alternatively, the adjustment module 386 may generate a lean fueling adjustment 393 at 428 to lean fueling of the cylinder 224. The fuel control module 332 leans the second target air/fuel ratio for the cylinder 224 based on the lean fueling adjustment 393. The second target air/fuel ratio, however, remains fuel rich relative to stoichiometry (or at stoichiometry) after this adjustment. Leaning the fueling of the cylinder 224 and/or decreasing exhaust flow to the second TWC 244 decreases reductant flow to the second TWC 244. This decreases ammonia flow to the SCR catalyst 248, which may maintain the Ammonia storage of the SCR catalyst 248 at a target. Control may then transfer to 432, which is discussed further below. If 424 is false, control continues with 432.

At 432, the adjustment module 386 determines whether an EGR air/fuel ratio 394 measured using the second air/fuel sensor 260 is greater than the target air/fuel ratio at the second air/fuel sensor 260 by at least a first predetermined amount. If 432 is true, the adjustment module 386 generates a second throttle adjustment 395 to decrease the opening of the second throttle valve 232 at 436. The throttle control module 316 decreases the second target throttle opening 322 of the second throttle valve 232 to close the second throttle valve 232 based on the second throttle adjustment 395.

Additionally or alternatively, the adjustment module 386 may generate the rich fueling adjustment 392 at 436 to richen fueling of the cylinder 224. The fuel control module 332 richens the second target air/fuel ratio for the cylinder 224 based on the rich fueling adjustment 392. Richening fueling of the cylinder 224 and/or decreasing opening of the second throttle valve 232 richens the recirculated exhaust gas. Control may then transfer to 448, which is discussed further below. If 432 is false, control continues with 440.

At 440, the adjustment module 386 may determine whether the EGR air/fuel ratio 394 measured using the second air/fuel sensor 260 is less than the target air/fuel ratio at the second air/fuel sensor 260 by at least a second predetermined amount. If 440 is true, the adjustment module 386 generates the second throttle adjustment 395 to increase the opening of the second throttle valve 232 at 444. The throttle control module 316 increases the second target throttle opening 322 of the second throttle valve 232 to open the second throttle valve 232 based on the second throttle adjustment 395.

Additionally or alternatively, the adjustment module 386 may generate the lean fueling adjustment 393 at 444 to lean fueling of the cylinder 224. The fuel control module 332 leans the second target air/fuel ratio for the cylinder 224 based on the lean fueling adjustment 393. The second target air/fuel ratio, however, remains fuel rich relative to stoichiometry (or at stoichiometry) after this adjustment. Leaning fueling of the cylinder 224 and/or increasing opening of the second throttle valve 232 increases the amount of oxygen in the recirculated exhaust gas. Control may then transfer to 448, which is discussed further below. If 440 is false, control continues with 448.

At 448, the second throttle actuator module 236 controls the second throttle valve 232 based on the second target throttle opening 322. The EGR actuator module 172 controls the position of the EGR valve 242 based on the target position 352. The fuel control module 332 also controls fueling of one of the cylinders 118, 216, and 220 based on the first target air/fuel ratio and/or controls fueling of the cylinder 224 based on the second target air/fuel ratio. Control then returns to 404 for a next control loop.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. An engine control system of a vehicle, comprising:
a fuel control module that controls fuel injection of a first cylinder of an engine based on a first target air/fuel ratio that is fuel lean relative to a stoichiometric air/fuel ratio and that controls fuel injection of a second cylinder of the engine based on a second target air/fuel ratio that is fuel rich relative to stoichiometry, wherein the first cylinder outputs exhaust to a first three way catalyst (TWC), and wherein the second cylinder outputs exhaust to an exhaust gas recirculation (EGR) valve; and an EGR control module that controls opening of the EGR valve to:
(i) a second TWC that reacts with nitrogen oxides (NOx) in the exhaust and outputs ammonia to a selective catalytic reduction (SCR) catalyst;
(ii) a conduit that recirculates exhaust back to an intake system of the engine at a location downstream of a compressor of a turbocharger; and
(iii) the first TWC.

2. An engine control system of a vehicle, comprising:

a fuel control module that controls fuel injection of a first cylinder of an engine based on a first target air/fuel ratio that is fuel lean relative to a stoichiometric air/fuel ratio and that controls fuel injection of a second cylinder of the engine based on a second target air/fuel ratio that is fuel rich relative to stoichiometry, wherein the first cylinder outputs exhaust to a first three way catalyst (TWC), and wherein the second cylinder outputs exhaust to an exhaust gas recirculation (EGR) valve; and an EGR control module that controls opening of the EGR valve to:
(i) a second TWC that reacts with nitrogen oxides (NOx) in the exhaust and outputs ammonia to a selective catalytic reduction (SCR) catalyst;
(ii) a conduit that recirculates exhaust back to an intake system of the engine; and
(iii) the first TWC.

3. The engine control system of claim 2 wherein the fuel control module increases the second target air/fuel ratio to lean fueling of the second cylinder when NOx measured using a Nox sensor downstream of the SCR catalyst is less than a target Nox at the Nox sensor.

4. The engine control system of claim 2
wherein, when NOx measured using a Nox sensor downstream of the SCR catalyst is greater than a target Nox at the Nox sensor, the EGR control module:
increases the opening of the EGR valve to the second TWC to increase exhaust flow to the second TWC; and
decreases the opening of the EGR valve to the conduit that directs exhaust back to the intake system to decrease exhaust recirculation back to the intake system.

5. The engine control system of claim 2
wherein, when NOx measured using a Nox sensor downstream of the SCR catalyst is less than a target Nox at the Nox sensor, the EGR control module:
decreases the opening of the EGR valve to the second TWC to decrease exhaust flow to the second TWC; and
increases the opening of the EGR valve to the conduit that directs exhaust back to the intake system to increase exhaust recirculation back to the intake system.

6. The engine control system of claim 2 wherein the fuel control module decreases the second target air/fuel ratio to richen fueling of the second cylinder when an air/fuel ratio measured using a sensor in the conduit is greater than a target air/fuel ratio at the sensor.

7. The engine control system of claim 2 wherein the fuel control module increases the second target air/fuel ratio to lean fueling of the second cylinder when an air/fuel ratio measured using a sensor in the conduit is less than a target air/fuel ratio at the sensor.

8. The engine control system of claim 2 further comprising a throttle control module that, when an air/fuel ratio measured using a sensor in the conduit is greater than a target air/fuel ratio at the sensor, decreases an opening of a throttle valve that regulates flow from an intake manifold into the second cylinder,
wherein the throttle valve does not regulate flow from the intake manifold into the first cylinder.

9. The engine control system of claim 2 further comprising a throttle control module that, when an air/fuel ratio measured using a sensor in the conduit is less than a target air/fuel ratio at the sensor, increases an opening of a throttle valve that regulates flow from an intake manifold into the second cylinder,
wherein the throttle valve does not regulate flow from the intake manifold into the first cylinder.

10. The engine control system of claim 2 wherein:
the first TWC includes one or more materials that provide an oxygen storage capacity of at least a predetermined capacity that is greater than zero; and
the second TWC has an oxygen storage capacity of approximately zero.

11. An engine control method for a vehicle, comprising:
controlling fuel injection of a first cylinder of an engine based on a first target air/fuel ratio that is fuel lean relative to a stoichiometric air/fuel ratio,
wherein the first cylinder outputs exhaust to a first three way catalyst (TWC);
controlling fuel injection of a second cylinder of the engine based on a second target air/fuel ratio that is fuel rich relative to stoichiometry,
wherein the second cylinder outputs exhaust to an exhaust gas recirculation (EGR) valve; and
controlling opening of the EGR valve to:
(i) a second TWC that reacts with nitrogen oxides (NOx) in the exhaust and outputs ammonia to a selective catalytic reduction (SCR) catalyst; and
(ii) a conduit that recirculates exhaust back to an intake system of the engine; and
(iii) the first TWC.

12. The engine control method of claim 11 further comprising decreasing the second target air/fuel ratio to richen fueling of the second cylinder when NOx measured using a NOx sensor downstream of the SCR catalyst is greater than a target NOx at the NOx sensor.

13. The engine control method of claim 11 further comprising increasing the second target air/fuel ratio to lean fueling of the second cylinder when NOx measured using a NOx sensor downstream of the SCR catalyst is less than a target NOx at the NOx sensor.

14. The engine control method of claim 11 further comprising, when NOx measured using a NOx sensor downstream of the SCR catalyst is greater than a target NOx at the NOx sensor:
increasing the opening of the EGR valve to the second TWC to increase exhaust flow to the second TWC; and
decreasing the opening of the EGR valve to the conduit that directs exhaust back to the intake system to decrease exhaust recirculation back to the intake system.

15. The engine control method of claim 11 further comprising, when NOx measured using a NOx sensor downstream of the SCR catalyst is less than a target NOx at the NOx sensor:
decreasing the opening of the EGR valve to the second TWC to decrease exhaust flow to the second TWC; and increasing the opening of the EGR valve to the conduit that directs exhaust back to the intake system to increase exhaust recirculation back to the intake system.

16. The engine control method of claim 11 further comprising:
   decreasing the second target air/fuel ratio to richen fueling of the second cylinder when an air/fuel ratio measured using a sensor in the conduit is greater than a target air/fuel ratio at the sensor; and
   increasing the second target air/fuel ratio to lean fueling of the second cylinder when the air/fuel ratio measured using the sensor in the conduit is less than the target air/fuel ratio at the sensor.

17. The engine control method of claim 11 further comprising, when an air/fuel ratio measured using a sensor in the conduit is greater than a target air/fuel ratio at the sensor, decreasing an opening of a throttle valve that regulates flow from an intake manifold into the second cylinder,
   wherein the throttle valve does not regulate flow from the intake manifold into the first cylinder.

18. The engine control method of claim 11 further comprising, when an air/fuel ratio measured using a sensor in the conduit is less than a target air/fuel ratio at the sensor, increasing an opening of a throttle valve that regulates flow from an intake manifold into the second cylinder,
   wherein the throttle valve does not regulate flow from the intake manifold into the first cylinder.

19. The engine control method of claim 11 wherein:
   the first TWC includes one or more materials that provide an oxygen storage capacity of at least a predetermined capacity that is greater than zero; and
   the second TWC has an oxygen storage capacity of approximately zero.

20. The engine control system of claim 2 wherein the fuel control module decreases the second target air/fuel ratio to richen fueling of the second cylinder when NOx measured using a Nox sensor downstream of the SCR catalyst is greater than a target Nox at the Nox sensor.

* * * * *